(12) United States Patent
 Chikahisa

(10) Patent No.: US 10,257,480 B2
(45) Date of Patent: Apr. 9, 2019

(54) PROJECTION DISPLAY APPARATUS AND PROJECTION METHOD FOR PROJECTION DISPLAY APPARATUS

(71) Applicant: NEC Display Solutions, Ltd., Tokyo (JP)

(72) Inventor: Shinichiro Chikahisa, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/115,886

(22) PCT Filed: Mar. 20, 2014

(86) PCT No.: PCT/JP2014/057707
§ 371 (c)(1),
(2) Date: Aug. 1, 2016

(87) PCT Pub. No.: WO2015/140980
PCT Pub. Date: Sep. 24, 2015

(65) Prior Publication Data
US 2017/0013240 A1    Jan. 12, 2017

(51) Int. Cl.
*G02B 27/22* (2018.01)
*H04N 9/31* (2006.01)
(Continued)

(52) U.S. Cl.
CPC ......... *H04N 9/3167* (2013.01); *G02B 5/3025* (2013.01); *G02B 5/3083* (2013.01);
(Continued)

(58) Field of Classification Search
CPC ........ G02B 27/22; G02B 27/02; G02B 27/24; G02B 27/281
(Continued)

(56) References Cited

U.S. PATENT DOCUMENTS 4,198,123 A * 4/1980 Kremen ............... G02B 5/3083
356/317
2003/0039036 A1 2/2003 Kruschwitz et al.
(Continued)

FOREIGN PATENT DOCUMENTS

CN    101120284 A    2/2008
CN    102472955 A    5/2012
(Continued)

OTHER PUBLICATIONS

Japanese Office Action dated Sep. 5, 2017 with an English translation thereof.
(Continued)

*Primary Examiner* — Steven H Whitesell Gordon
*Assistant Examiner* — Jerry Brooks
(74) *Attorney, Agent, or Firm* — McGinn I. P. Law Group, PLLC.

(57) ABSTRACT

A projection display apparatus that can prevent deviation in the light quantity distribution of the projected image is provided. A projection display apparatus includes: a light source unit including a light emitting element; an image light generator modulating light from the light source unit to emit image light; a projecting unit projecting the image light; a polarization modulator on which the image light is made incident and that emits light in a particular polarization state; and a depolarizer arranged on the optical path between the light emitting element and the polarization modulator.

14 Claims, 7 Drawing Sheets

(51) Int. Cl.
*G03B 21/20* (2006.01)
*G02B 5/30* (2006.01)
*G03B 21/00* (2006.01)
*G02B 5/04* (2006.01)

(52) U.S. Cl.
CPC ......... *G03B 21/008* (2013.01); *G03B 21/204* (2013.01); *G03B 21/208* (2013.01); *G03B 21/2013* (2013.01); *G03B 21/2073* (2013.01); *H04N 9/3105* (2013.01); *H04N 9/3161* (2013.01); *G02B 5/04* (2013.01)

(58) Field of Classification Search
USPC .............................................................. 353/7
See application file for complete search history.

(56) References Cited

U.S. PATENT DOCUMENTS

| | | | | |
|---|---|---|---|---|
| 2006/0221453 | A1* | 10/2006 | Koehler | G02B 5/3083 359/619 |
| 2008/0158512 | A1* | 7/2008 | Mizushima | G02B 5/3083 353/20 |
| 2011/0032483 | A1* | 2/2011 | Hruska | G02B 26/008 353/8 |
| 2012/0075588 | A1* | 3/2012 | Suga | G02B 27/283 353/20 |
| 2014/0028985 | A1* | 1/2014 | Janssens | G02B 27/48 353/31 |
| 2014/0139810 | A1* | 5/2014 | Matsubara | G03B 21/2013 353/31 |
| 2015/0219985 | A1* | 8/2015 | Shouji | G03B 21/2013 353/31 |

FOREIGN PATENT DOCUMENTS

| | | |
|---|---|---|
| JP | 2001-174750 A | 6/2001 |
| JP | 2002-350781 A | 12/2002 |
| JP | 2003-098476 A | 4/2003 |
| JP | 2003-161916 A | 6/2003 |
| JP | 2008-268465 A | 11/2008 |
| JP | 2011-257645 A | 12/2011 |
| JP | 2012-141574 A | 7/2012 |
| JP | 2013-182207 A | 9/2013 |
| WO | WO 2006/090681 A1 | 8/2006 |
| WO | WO 2006/090857 A1 | 8/2006 |
| WO | WO 2011/040479 A1 | 4/2011 |
| WO | WO 2013/008323 A1 | 1/2013 |
| WO | WO 2013/098877 A1 | 7/2013 |

OTHER PUBLICATIONS

Chinese Office Action (and Search Report) dated Mar. 28, 2017 with an English translation thereof.
International Search Report (ISR) (PCT Form PCT/ISA/210), in PCT/JP2014/057707, dated Jun. 17, 2014.

* cited by examiner

PROJECTION DISPLAY APPARATUS AND PROJECTION METHOD FOR PROJECTION DISPLAY APPARATUS

TECHNICAL FIELD

The present invention relates to a projection display apparatus and a projection method for a projection display apparatus

BACKGROUND ART

As the light source of a projector, a discharge lamp such as an ultra-high pressure mercury lamp has been widely used. However, in recent years, a projector, in which a solid state light source such as a LD (Laser Diode) is used instead of a discharge lamp, have been gaining attention. For example, Patent Document 1 discloses a projector that uses a solid state light source that emits linearly polarized light.

The solid state light source has a high durability and has an advantage that a time required for stabilizing the quantity of light is short, as compared with the discharge lamp. Further, since the solid state light source can output light that does not contain UV light rays, it is possible to prevent degradation of optical parts on which light enters.

Meanwhile, a projector in which polarized light is projected has been proposed recently. The projector of this kind is applied to, for example, a stereoscopic image display apparatus that makes the user view stereoscopic images, a secure display that makes only a particular user visually recognize particular information, and the like.

The stereoscopic display apparatus alternately projects two images taken from different points of view (image for right eye and image for left eye) onto the screen, by using two light beams whose polarization states are different from each other. When the user who wears polarized glasses, through which different polarized light is given for left and right eyes, views the projected image on the screen, the image light for right eye enters the right eye of the user and the image light for left eye enters the left eye of the user. As a result, the user can recognize the displayed image three-dimensionally.

On the other hand, the secure display projects, on the screen, an image that indicates particular info nation and its reversed image, each of which uses light having a different polarization direction. When the user who wears polarized glasses, that only allow light of a particularly polarization direction to pass, views the projected image on the screen, the user can visually recognize the particular information. On the other hand, since the user who does not wear the polarized glasses observes the state in which the particular information and the reversed image are overlapped, the user cannot visually recognize the particular information.

RELATED ART DOCUMENTS

Patent Documents

Patent Document 1: JP2013-182207A

DISCLOSURE OF THE INVENTION

Problems to be Solved by the Invention

However, when the solid state light source that emits polarized light as described in Patent Document 1 is used as a light source of a projector that projects polarized light, a problem causes in which there is deviation in the light quantity distribution of the projected image. Specifically, the polarized light emitted from the solid state light source happens to be scattered when transmitted through the optical parts inside the projector, and as a result, there may occur cases where the polarization state is disturbed. When a light component of a particular polarization is extracted from the light whose polarized state is disturbed, unbalanced energy distribution of the light that passes through the cross section of the flux may take place. When such light is used to project the image, deviation in the light quantity distribution of the projected image will cause.

For some projectors using a solid state light source, a hybrid type light source composed of, for example, a phosphor and a laser light source is used. In such a projector, the phosphor excited by the laser beam radiates yellow light, hence white light is emitted as a result of combination with blue laser light. In this case, the fluorescent light is non-polarized while the laser light is polarized, so that deviation in the light quantity distribution is only caused for the blue light, and as a result, deviation in the light quantity distribution of the projected image is observed as color unevenness.

FIGS. 1 and 2 are diagrams that each illustrate one example of a projected image with color unevenness. Due to deviation in the light quantity distribution of the projected image, the light quantity decreases at edges of the projected image so that the image becomes dark as shown in FIG. 1, or the light quantity increases at edges of the projected image so that the image becomes bright as shown in FIG. 2.

The object of the invention is to provide a projection display apparatus and a projection method of a projection display apparatus that can prevent deviation in the light quantity distribution of the projected image.

Means for Solving the Problems

A projection display apparatus according to the present invention includes:
  a light source unit including a light emitting element;
  an image light generator that modulates light from the light source unit to emit image light;
  a projecting unit projecting the image light;
  a polarization modulator on which the image light is made incident and that emits light in a particular polarization state; and,
  a depolarizer that is arranged on the optical path between the light emitting element and the polarization modulator.

A projection display method for a projection display apparatus according to the present invention, includes:
  eliminating polarization of image light generated by light from a light source unit; and,
  emitting the image light with respect to which polarization was eliminated as light in a particular polarized state.

Effect of the Invention

According to the present invention, deviation in the light quantity distribution of the projected image can be prevented.

MODE FOR CARRYING OUT THE INVENTION

Figure 1:
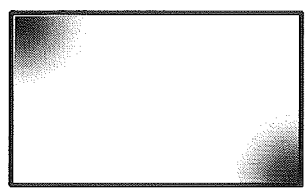
FIG. 1 A diagram for illustrating a state in which color unevenness is caused.
Figure 2:
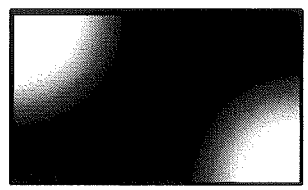
FIG. 2 A diagram for illustrating a state in which color unevenness is caused.

Now, exemplary embodiments of the present invention will be described with reference to the accompanying drawings. Here, in this description and drawings, the components having the same functions are allotted with the same reference numerals, so that repeated description may be omitted.

First Exemplary Embodiment

Figure 3:
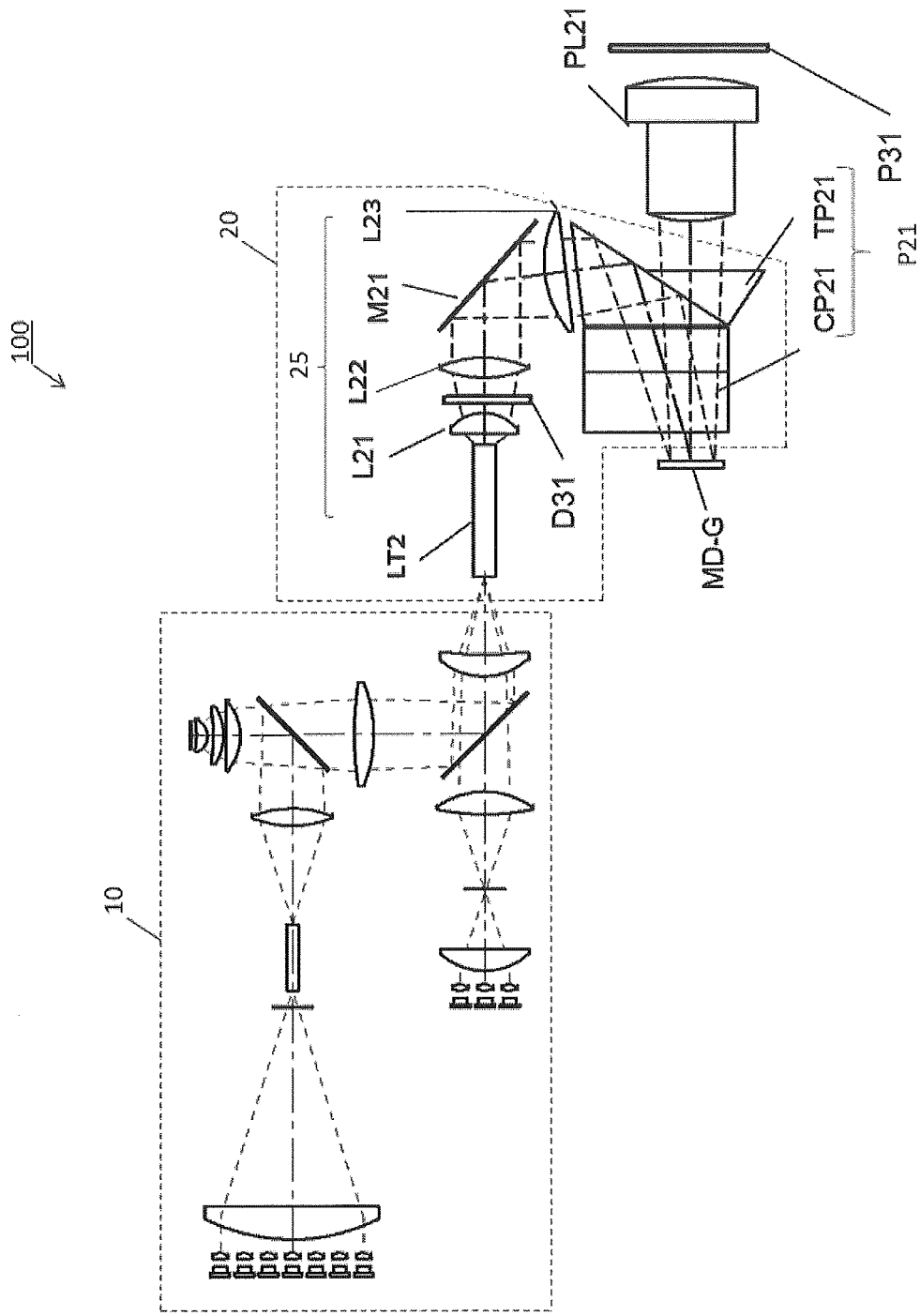
FIG. 3 A diagram for illustrating a configuration of projector 100 according to the first exemplary embodiment of the present invention.

FIG. 3 is a diagram for illustrating a configuration of projector 100 according to the first exemplary embodiment of the present invention.

Projector 100 includes light source unit 10, illumination optical system 20, green display device MD-G, projecting unit PL21 and polarization modulator P31. Though omitted in FIG. 3 for simplicity, actual projector 100 includes red display device MD-R and blue display device MD-B in addition to green display device MD-G. Hereinbelow, when green display device MD-G, red display device MD-R and blue display device MD-B do not need to be distinguished, green display device MD-G, red display device MD-R and blue display device MD-B are called display devices MD as a whole.

Figure 4:
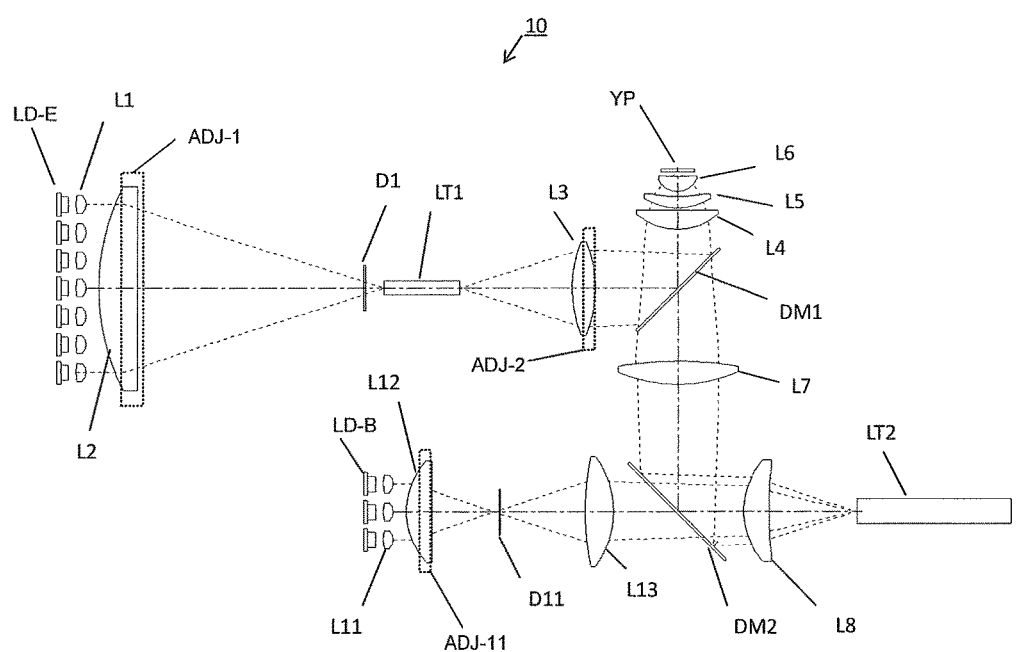
FIG. 4 A diagram for illustrating the detailed configuration of light source unit 10 in FIG. 3.

FIG. 4 is a diagram for illustrating the detailed configuration of light source unit 10.

Light source unit 10 includes laser light sources as light emitting elements emitting polarized light, and is a hybrid type light source using the laser light sources and a phosphor. Light source unit 10 includes phosphor YP, light emitting elements LD-E for excitation that excite phosphor YP and blue light sources LD-B. Light emitting element LD-E for excitation is a blue laser diode, which emits a blue laser beam as excitation light. Phosphor YP is excited by the excitation light emitted by light emitting elements LD-E for excitation to radiate yellow light that is yellow fluorescent light. Blue light source LD-B is a blue laser diode, and light source unit 10 emits white light that is composed of the yellow light emitted by phosphor YP and the blue light emitted by blue light sources LD-B.

Specifically, light source unit 10 includes a plurality of light emitting elements LD-E for excitation that are arranged in a matrix, a plurality of lenses L1 that are arranged in a matrix to correspond to light emitting elements LD-E for excitation, respectively, lens L2, diffusing plate D1 and light tunnel LT1.

Light source unit 10 further includes lens L3, dichroic mirror DM1, lens L4, lens L5, lens L6, phosphor YP, lens L7, dichroic mirror DM2 and lens L8.

Light source unit 10 further includes a plurality of blue light sources LD-B that are arranged in a matrix, a plurality of lenses LD11 that are arranged in a matrix to correspond to blue light sources LD-B, respectively, lens LD2, diffuser D11 and lens 13.

The excitation light emitted from each light emitting element LD-E for excitation is collimated by each lens L1 and the collimated excitation light enters lens L2. The excitation light that entered lens L2 is condensed by lens L2 at the incident opening of light tunnel LT1.

The excitation light condensed by lens L2 enters diffusing plate D1 before the incident opening of light tunnel LT1 and is diffused by diffusing plate D1, and then the diffused light enters light tunnel LT1. The light that entered light tunnel LT1 is reflected multiple times on the interior reflecting surface inside light tunnel LT1. As a result, the illuminance distribution of the excitation light is made uniform near the outgoing opening of light tunnel LT1.

The excitation light emitted from light tunnel LT1 passes through lens L3 to enter dichroic mirror DM1. Dichroic mirror DM1 reflects blue light and transmits yellow light. Accordingly, the excitation light incident on dichroic mirror DM1 is reflected to enter lens L4. The excitation light incident on lens L4 passes through lens L4, lens L5 and lens L6 to illuminate phosphor YP.

Phosphor YP is excited by the excitation light to radiate yellow light. The yellow light radiated by phosphor YP passes through lens L6, lens L5 and lens L4 to enter dichroic mirror DM1. The yellow light incident on dichroic mirror DM1 passes through dichroic minor DM1 to enter lens L7. The yellow light incident on lens L7 passes through lens 7 to enter dichroic mirror DM2. Dichroic minor DM2 reflects yellow light and transmits blue light. Accordingly, the yellow light incident on dichroic minor DM2 is reflected by dichroic mirror DM2 to enter lens L8. The yellow light incident on lens L8 is condensed by lens L8 at the incident opening of light tunnel LT2.

The blue light emitted from each blue light source LD-B is collimated by each lens L11 and the collimated blue light enters lens L12. The blue light incident on lens L12 is condensed at around diffuser D11 by lens L12. The blue light incident on diffuser D11 is diffused by diffuser D11 and the diffused blue light enters lens L13.

The blue light incident on lens L13 passes through lens L13 to enter dichroic minor DM2. The blue light incident on dichroic mirror DM2 passes through dichroic mirror DM2 to enter lens L8. The blue light incident on lens L8 is condensed by lens L8 at the incident opening of light tunnel LT2. Accordingly, dichroic minor DM2 functions as a combiner in which the yellow light radiated by phosphor YP and the blue light emitted by blue light sources LD-B are combined onto the same optical axis.

Description will be returned to FIG. 3.

Illumination optical system 20 makes light from light source unit 10 incident on each display device MD such that the light distribution becomes uniform, and makes image light exited from each display device MD incident to projecting unit PL21. Illumination optical system 20 includes light tunnel LT2, lens L21, depolarizing element D31, lens L22, mirror M21 and lens L23. Illumination optical system 20 further includes TIR (Total Internal reflection) prism TP21 and color prism CP21.

Light tunnel LT2 is an illuminance uniformizing unit that makes the illuminance of light from light source unit 10 uniform. Each of yellow light and blue light that entered light tunnel LT2 from light source unit 10 is reflected multiple times on the reflecting surface inside light tunnel LT2. As a result, the illuminance distributions of the yellow light and blue light are made uniform near the outgoing opening of light tunnel LT2. The light exited from light tunnel LT2 is white light obtained by combining the yellow light and the blue light.

The white light exited from light tunnel LT2 enters lens L21. The white light incident on lens L21 passes through lens L21 to enter depolarizing element D31.

Depolarizing element D31 is a depolarizer that is arranged on the optical path between blue light sources LD-B and polarization modulator P31 and that converts the incident light to non-polarized light. Depolarizing element D31 changes the polarization state of the incident light so that the light that entered Depolarizing element D31 becomes non-polarized light whose vibration direction is not aligned and randomly changes, unlike light having a particular polarization direction such as linear polarization, circular polarization, and elliptical polarization or like, and light whose polarization direction is periodically changed.

Depolarizing element D31 may be an element that eliminates polarization by using a material having optical anisotropy. Depolarizing element D31 may employ, for example, a wedge-shaped quartz plate as a material having optical anisotropy. For example, by using two wedge-shaped quartz plates which are bonded together such that their optical axes are oriented at an angle of 45° to each other, it is possible to change the polarization state of the incident light to produce light whose vibration direction randomly changes.

Depolarizing element D31 should not be limited to the above as long as it can produce multiple states of polarization. For example, depolarizing element D31 may be an element that is composed of a plurality of periodic structures, each periodic structure including grooves that are periodically arrayed at an interval that is shorter than the wavelengths of light that passes through the substrate. In this element, the arrangement direction of the grooves differs from each periodic structure and the grooves of each periodic structure that are not constant do not have a fixed depth. Each periodic structure includes grooves a plurality of depths. The white light incident on depolarizing element D31, by passing through depolarizing element D31, is converted to non-polarized light and enters lens L22.

The white light incident on lens L22 passes through lens L22 and enters mirror M21. The white light incident on mirror M21 is reflected by mirror M21 and enters lens L23. The white light incident on lens L23 passes through lens L23 and enters TIR prism TP21. Thus, lens L21, lens L22, mirror M21 and lens L23 function as lens unit 25 that uniformizes light that exited from light tunnel LT2 and makes the uniform light incident on display device MD by way of TIR prism TP21. Depolarizing element D31 is arranged on the optical path in this lens unit 25 so as to change the state of polarization of the light that is spread in beam diameter by means of lens unit 25.

TIR prism TP21 has a configuration in which two triangular prisms are combined via an air layer, and the boundary planes between the triangular prisms and the air layer function as total reflection surfaces. Accordingly, when light enters the boundary plane at an incident angle equal to or greater than the critical angle, the incident light is totally reflected by the boundary plane, whereas when light enters the boundary plane at an incident angel less than the critical angle, the incident light passes through the boundary plane.

Since TIR prism TP21 is arranged so that light that passed through lens L23 enters TIR prism TP21 at an incident angle equal to or greater than the critical angle, the white light incident on TIR prism TP21 is totally reflected by the interior boundary plane of TIR prism TP21 and enters color prism CP21.

Color prism CP21 separates the white light that entered color prism CP21 from TIR prism TP21 into green light, red light and blue light. The green light separated by color prism CP21 enters green display device MD-G, the red light enters red display device MD-R, and the blue light enters blue display device MD-B.

Display device MD, which is a DMD (Digital Micromirror Device), includes a plurality of micromirrors and a driver for driving the micromirrors. Green display device MD-G, red display device MD-R and blue display device MD-B are image light generators that modulate light from light source unit 10 to generate image lights of green, red and blue, respectively. The image light emitted by each display device MD enters color prism CP21. Each color image light incident on color prism CP21 is combined by color prism CP21 and the combined image light enters TIR prism TP21. The image light incident on TIR prism TP21 passes through TIR prism TP21 and enters projecting unit PL21.

In the above way, TIR prism TP21 and color prism CP21 function as prims unit P21 that makes the light emitted from light tunnel LT2 incident on display devices MD and makes the image light emitted by display devices MD incident to projecting unit PL21.

Projecting unit PL21 is a group of lenses for projecting the incident image light. The image light projected by projecting unit PL21 enters polarization modulator P31.

Polarization modulator P31 is a polarization modulating unit to which the image light is made incident and that emits the image light as light having a particular polarization state. Polarization modulator P31, which is composed of, for example, a polarizing plate and a liquid crystal, extracts light of different polarization states from the image light in a time division manner. For example, polarization modulator P31 extracts two lights having different polarization states alternately from the image light in a time division manner. Polarization modulator P31, for example, extracts right-handed circularly polarized light and left-handed circularly polarized light alternately from the image light in a time division manner. Further, polarization modulator P31 may extract two linearly polarized lights having different polarization directions alternately from the image light in a time division manner.

Further, polarization modulator P31 may extract three or more lights having different polarization states from the image light in a time division manner. In this case, polarization modulator P31 can sequentially extract light that is in any polarization state from among, for example, right-handed circular polarization, left-handed circular polarization, linear polarization and elliptical polarization in a time division manner.

Further, when polarization modulator P31 is disposed on the optical path of projector 100, since light having a particular polarization state is extracted from the image light, part of light that entered polarization modulator P31 is not transmitted through polarization modulator P31 and is not projected on the screen. Thus, utilization efficiency of the image light is decreased and the brightness of the projected image is lowered. Therefore, polarization modulator P31 is provided in a detachable manner so that when it is not necessary for projector 100 to project polarized light, the image light can be directly projected by removing polarization modulator P31.

In the above first exemplary embodiment, a configuration in which depolarizing element D31 is arranged in illumination optical system 20 is described as an example. In the example of FIG. 3, depolarizing element D31 is arranged in lens unit 25 inside illumination optical system 20, and more specifically, depolarizing element D31 is disposed on the optical path between lens L21 and lens L22. However, the present invention should not be limited to this example. In a case where depolarizing element D31 is configured to eliminate polarization by making use of optical path differences of separated multiple fluxes of light to produce phase difference among the multiple light fluxes, it is preferable that depolarizing element D31 be arranged at a place where the light flux has the greatest diameter in order to increase the optical path differences. The exit surface of light tunnel LT2 is conjugate to display device MD. If there exist scratches, dust and dirt near the exit surface of light tunnel LT2, their images are formed on the screen. Accordingly, it is preferable that depolarizing element D31 be arranged at a position away from the conjugate surface.

In the present exemplary embodiment, projector 100 is a three-panel type projector, in which prism unit P21 splits light from light source unit 10 and causes light beams to be split towards individual display devices MD and combines the images of light emitted from individual display devices MD on the same optical axis and emits the combined image. If depolarizing element D31 is provided on the optical path of light that has been split from light source unit 10, one depolarizing element D31 needs to be provided for every each beam of light that has been split from light source unit 10. Therefore, it is preferable that depolarizing element D31 be disposed on the optical path at a position before light from light source unit 10 has been split or at a position after images of light have been combined.

In the present exemplary embodiment, polarization modulator P31 is removably provided. When depolarizing element D31 is attached or removed, it is preferable that the imaging relation of the image light is not changed before and after attaching/detaching. Therefore, if depolarizing element D31 is detachably provided, the element is preferably disposed in illumination optical system 20 on the optical path of light from light source unit 10 to incidence on display devices MD.

As described heretofore, according to the first exemplary embodiment of the present invention, light from light source unit 10 is modulated by display devices MD to create image light. Depolarizing element D31 is arranged on the optical path between blue light source LD-B and polarization modulator P31, so that polarization of the light incident on depolarizing element D31 is eliminated. Accordingly, even if light emitted from light source unit 10 is polarized light, the image light that enters polarization modulator P31 becomes non-polarized, hence the image light does not present any unevenness due to directions of polarization, so that the light intensity distribution of light that has been passed through polarization modulator P31 is free from unevenness. It is hence possible to prevent unevenness of the light intensity distribution in the projected image.

Further, in the present exemplary embodiment, depolarizing element D31 is composed of two wedge-shaped quartz plates having optical anisotropy, the two quartz plates being arranged with their optical axes oriented at an angle of 45° to each other. As a result, depolarizing element D31 can eliminate polarization regardless of the polarization state of the incident light on depolarizing element D31. For example, when a light source, in which a plurality (e.g., some tens) of LDs are arrayed, is used, individual LDs may present different polarization states due to variability in performance and design of the LDs. Even in such a case, since the polarization of the image light can be more reliably eliminated, it is possible to prevent unevenness of the light intensity distribution in the projected image.

In the present exemplary embodiment, depolarizing element D31 is arranged on the optical path between light source unit 10 and display device MD. Since this arrangement makes it possible to prevent the effect on image forming characteristics that results from the difference between depolarizing element D31 being placed on the optical path and depolarizing element D31 being removed from the optical path, it is possible to attach and remove depolarizing element D31 as necessary. As a result, it is possible to increase the brightness of the projected image when it is not necessary for projector 100 to project polarized light.

In the present exemplary embodiment, illumination optical system 20 includes light tunnel LT2, lens L21 and prism unit P21. Light tunnel LT2 makes the illuminance of light from light source unit 10 uniform. Prism unit P21 leads light exited from light tunnel LT2 to display device MD and also makes the image light generated by display device MD incident to projecting unit PL21. Lens L21 is arranged on the optical path between light tunnel LT2 and prism unit P21. Depolarizing element D31 is arranged on the optical path between lens 21 and prism unit P21 to change the polarization state of light that passed through lens L21. There occurs difference in image forming characteristics between depolarizing element D31 being placed on the optical path and depolarizing element D31 being removed from the optical path. However, depolarizing element D31 is several millimeters while the illumination optical system has redundancy, so that depolarizing element D31 can be attached or removed as necessary. Further, since depolarizing element D31 is disposed at a position where the beam diameter of the light flux spreads, when depolarizing element D31 reflects multiply divided light fluxes, large optical path differences arise between the light fluxes, producing large phase differences, thus positively eliminating polarization. As a result, it is possible to positively prevent unevenness of the light intensity distribution in the projected image.

In the present exemplary embodiment, multiple display devices MD are used. Prism unit P21 splits light from light source unit 10 and makes the split light components incident on individual display devices MD and combines the images of light emitted from the individual display devices MD and makes the combined image light incident to projecting unit PL21. Further, depolarizing element D31 is placed on the optical path between light emitting element LD-B and prism unit P21, or on the optical path between prism unit P21 and polarization modulator P31. Accordingly, when light is split so as to create separate images of light, depolarizing element D31 is arranged at a position where light is combined before beam splitting or after beam combining, hence multiple depolarizing element D31 are not needed, thus making it possible to prevent the cost of projector 100.

In the present exemplary embodiment, depolarizing element D31 is configured to change the polarization state of the incident light so that light that enters depolarizing element D31 is converted to light that includes different multiple polarized conditions across the same plane perpendicular to the direction of propagation of the light. This allows light that passed through depolarizing element D31 to be more certainly non-polarized. Accordingly, it is possible to positively prevent unevenness of the light intensity distribution in the projected image.

The Second Exemplary Embodiment

Figure 5:
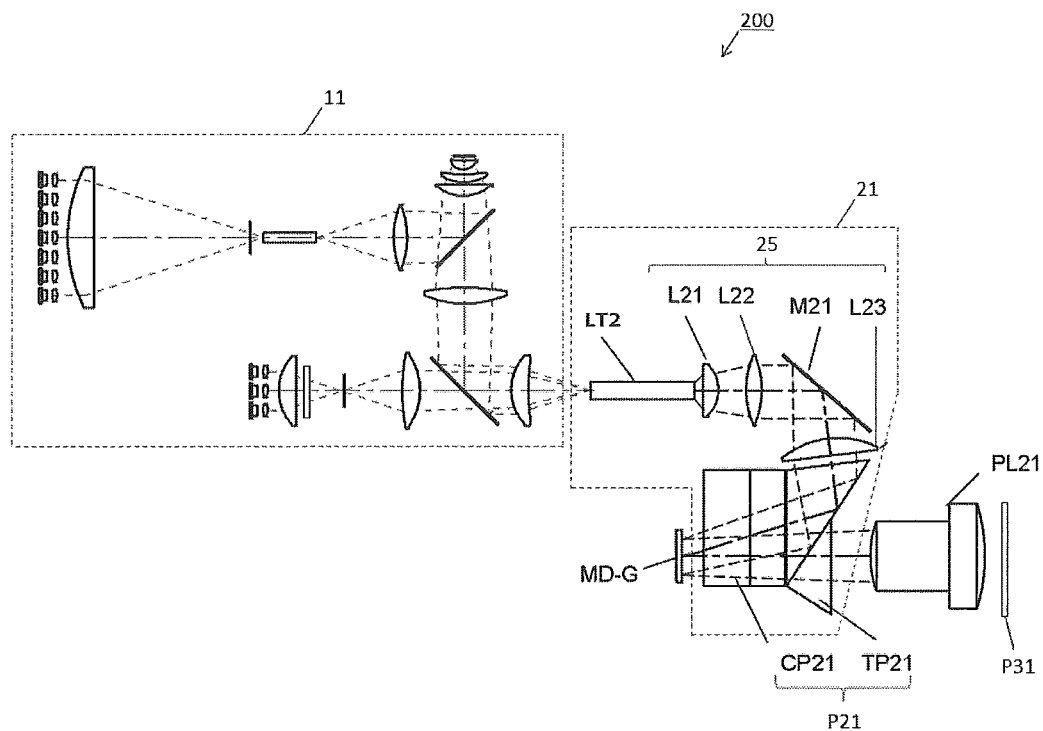
FIG. 5 A diagram for illustrating a configuration of projector 200 according to the second exemplary embodiment of the present invention.

FIG. 5 is a diagram for illustrating a configuration of projector 200 according to the second exemplary embodiment of the present invention.

Although in projector 100 a depolarizing element is arranged in the illumination optical unit, the present invention is not limited to this example. In projector 200, a depolarizing element is arranged in the light source unit. The following description will be given by focusing on the difference from projector 100, so that description on the same components as those of projector 100 is omitted.

Projector 200 includes light source unit 11, illumination optical system 21, display device MD, projecting unit PL21 and polarization modulator P31.

Figure 6:
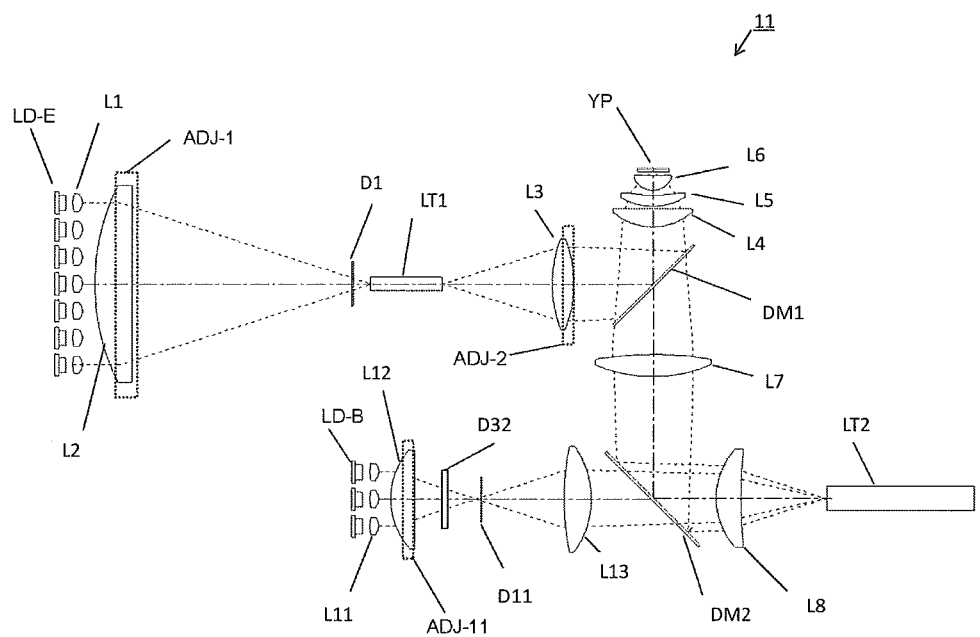
FIG. 6 A diagram for illustrating the detailed configuration of light source unit 11 in FIG. 5.

FIG. 6 is a diagram for illustrating a configuration of light source unit 11. Light source unit 11 includes depolarizing element D32 in addition to the configuration of light source unit 10 of projector 100. Depolarizing element D32 is disposed inside light source unit 11, on the optical path of the blue light emitted from blue light sources LD-B. For example, Depolarizing element D32 is arranged on the optical path between lens L12 and diffuser D11. In this arrangement, polarized blue light emitted from blue light sources LD-B is incident on depolarizing element D32 and the polarization state of the blue light incident on depolarizing element D32 is changed to unpolarized light state.

Description will be returned to FIG. 5. Illumination optical system 21 is the same as illumination optical system 20 of projector 100 from which depolarizing element D31 is omitted. Since light source unit 11 includes depolarizing element D32, unpolarized white light free from polarization enters illumination optical system 21.

As described above, according to the second exemplary embodiment of the present invention, depolarizing element D32 is provided inside light source unit 11, on the optical path of the polarized blue light emitted from blue light sources LD-B. Since this arrangement makes it possible to depolarize the polarized light emitted from blue light sources LD-B in a more reliable manner, the light intensity distribution of the light that passed through polarization modulator P31 will not involve any unevenness, therefore it is possible prevent unevenness of the light intensity distribution of the image light in a more positive manner.

The Third Exemplary Embodiment

Figure 7:
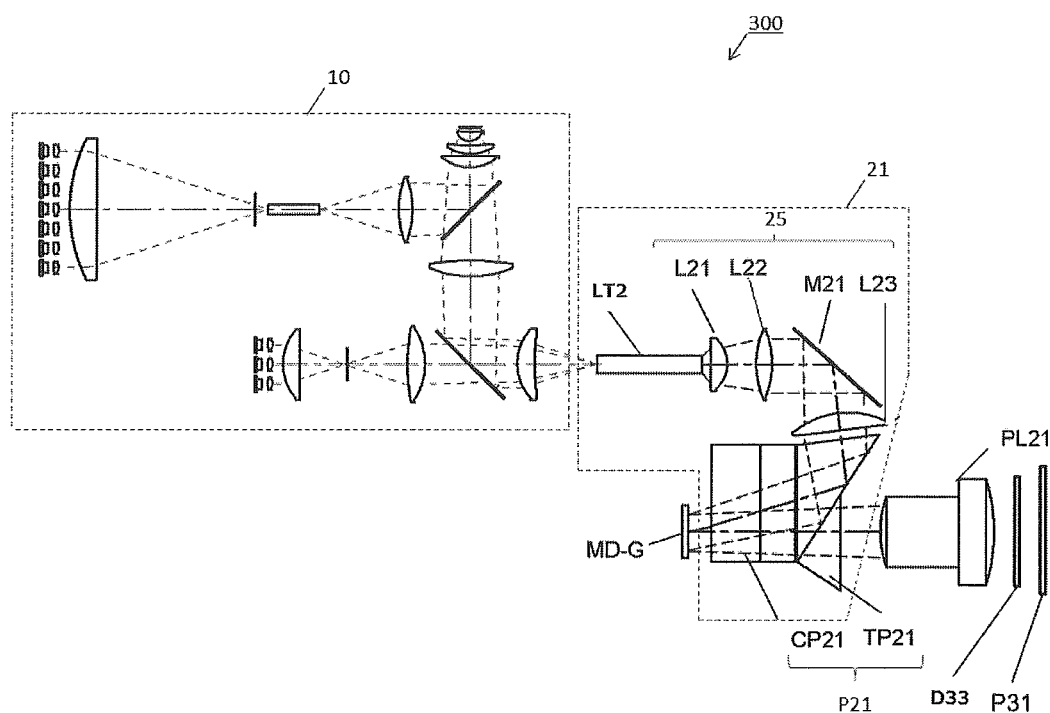
FIG. 7 A diagram for illustrating a configuration of projector 300 according to the third exemplary embodiment of the present invention.

FIG. 7 is a diagram for illustrating a configuration of the optical system of projector 300 according to the third exemplary embodiment of the present invention.

Although in projector 100 a depolarizing element is arranged in the illumination optical unit, and in projector 200 a depolarizing element is arranged in the light source unit, the present invention is not limited to these examples. In projector 300, a depolarizing element is arranged on the optical path between the projected surface (not shown) to which the image light is projected and display element MD.

Projector 300 includes light source unit 10, illumination optical system 21, display device MD, projecting unit PL21, depolarizing element D33 and polarization modulator P31.

Since light source unit 10 has the same configuration as that of light source unit 10 described in the first exemplary embodiment, and illumination optical system 21 is the same as the illumination optical system 21 described in the second exemplary embodiment, these descriptions are omitted herein.

Depolarizing element D33 is provided on the optical path between the projection surface and display device MD, for example, on the optical path between projecting unit PL21 and polarization modulator P31. As a result, the image light exited from projecting unit PL21 enters depolarizing element D33. Depolarizing element D33 changes the polarization state of the incident image light to be converted to unpolarized light. Accordingly, polarization modulator P31 receives unpolarized image light.

As described above, according to the third exemplary embodiment of the present invention, depolarizing element D33 is provided on the optical path between light source unit 10 and polarization modulator P31, and on the optical path between display device MD and polarization modulator P31. As a result, the image light generated by display device MD is incident on depolarizing element D33, and unpolarized image light is incident on polarization modulator P31. Since this arrangement makes it possible to depolarize the light incident on polarization modulator P31 in a more reliable manner, the light intensity distribution of light that passed through polarization modulator P31 will not involve any unevenness, therefore it is hence possible to prevent unevenness of the light intensity distribution of the image light in a more positive manner.

The Fourth Exemplary Embodiment

Figure 8:
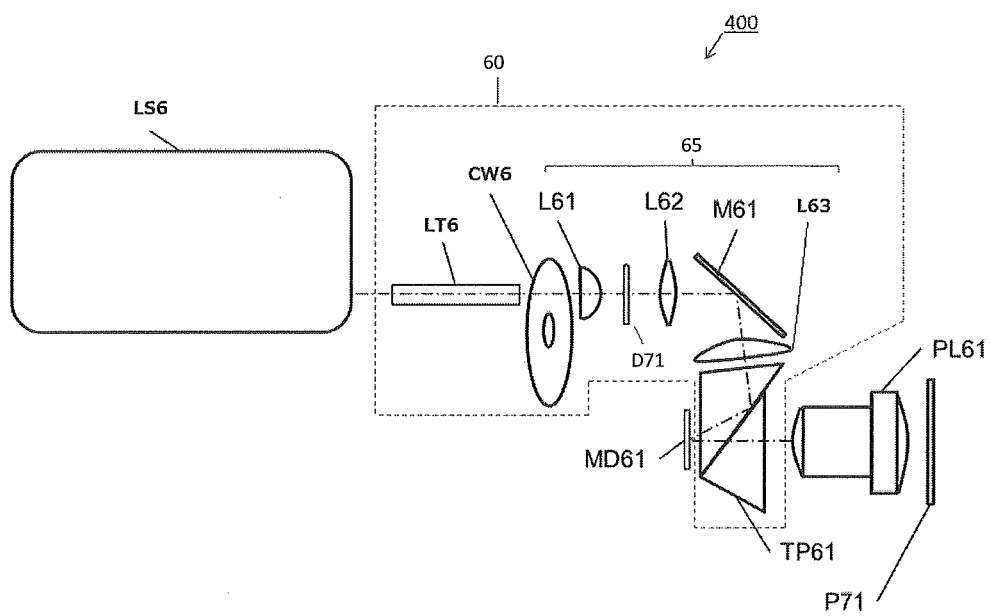
FIG. 8 A diagram for illustrating a configuration of projector 400 according to the fourth exemplary embodiment of the present invention.

FIG. 8 is a diagram for illustrating a configuration of the optical system of projector 400 according to the fourth exemplary embodiment of the present invention.

Projector 400, which is a single-plate type projector, includes light source unit LS6, illumination optical system 60, display device MD61, projecting unit PL61 and polarization modulator P71. Illumination optical system 60 includes light tunnel LT6, color wheel CW6, lens L61, depolarizing element D71, lens L62, mirror M61, lens L63 and TIR prism TP61.

Light source unit LS6 includes solid-state light sources that emit polarized light. This light source may, for example have the same configuration as that of light source unit 10 described with FIG. 3 in the first exemplary embodiment. Light emitted from light source unit LS6 is condensed at the incident opening of light tunnel LT6. Light that entered light tunnel LT6 is reflected multiple times inside light tunnel LT6, so that the illuminance distribution of the light is made uniform near the outgoing opening of light tunnel LT6.

Color wheel CW6 includes a disc, that includes a plurality of transmissive zones that each transmit a different color of light, and a motor for turning the disc. As the disc is turned by the motor, the position on the disc on which light from light source unit LS6 is incident moves so that the light enters different transmissive zones by turns. As a result, the color of light that passed through color wheel CW6 varies in a time division manner. Light that exited from color wheel CW6 is incident on lens L61. The light incident on lens L61 passes through lens L61 and enters depolarizing element D71.

Depolarizing element D71 is a depolarizer that changes the polarization state of the incident light to be converted to unpolarized light. Depolarizing element D71 changes the polarization state of the incident light so that the resultant light contains different multiple random polarization states across the identical plane perpendicular to the direction of propagation of the incident light. For example, depolarizing element D71 may be an element that eliminates polarization by using a material that has optical anisotropy. The light incident on depolarizing element D71 is converted to unpolarized light free from polarization by passing through depolarizing element D71, and then the unpolarized light enters lens L62.

The light incident on lens L62 passes through lens L62 and enters mirror M61. The light incident on mirror M61 is reflected by mirror M61 to be incident on lens L63. The light incident on lens L63 passes through lens L63 and is incident on TIR prism TP61.

TIR prism TP61 has a configuration composed of two triangular prisms that are combined with an air layer in between, the boundary planes between the triangular prisms and the air layer functioning as total reflection surfaces. Accordingly, when a ray of light enters the boundary plane at an incident angle equal to or greater than the critical angle, the incident light is totally reflected, whereas when a ray of light enters the boundary plane at an incident angel less than the critical angle the incident light passes through the boundary plane.

Since TIR prism TP61 is arranged so that light that passed through lens L63 enters TIR prism TP61 at an incident angle equal to or greater than the critical angle, the light incident on TIR prism TP61 from lens L63 is totally reflected off by the interior boundary of TIR prism TP61 and enters display device MD61.

Display device MD61, which is a DMD, includes a plurality of micromirrors and a driver for driving the micro mirrors. Display device MD61 is an image light generator that modulates incident light to generate image light. Display device MD61 emits the generated image light toward TIR prism TP61. The image light that is emitted from display device MD61 reenters TIR prism TP61. Since TIR prism TP61 is arranged so that the image light is incident on the boundary plane at an angle less than the critical angle, the image light passes through the boundary plane and enters projecting unit PL61.

Projecting unit PL61 is a group of lenses for projecting the incident image light. The image light that is projected by projecting unit PL61 enters polarization modulator P71.

Polarization modulator P71 has the same function as polarization modulator P31.

Although in the present exemplary embodiment, depolarizing element D71 is arranged between lens L61 and lens L62, the present invention should not be limited to this example. Also in the single-plate projector, depolarizing element D71 may be arranged on the optical path in the light source unit, similarly to projector 200. Similar to projector 300, depolarizing element D71 may be arranged on the optical path between the projection surface (not shown) on which the image light is projected and display device MD.

As has been described heretofore, according to the fourth exemplary embodiment of the present invention, light from light source unit LS6 that emits polarized light is modulated by display device MD to create image light. Depolarizing element D71 is arranged on the optical path between light source unit LS6 and polarization modulator P71, so that the light incident on depolarizing element D71 becomes unpolarized light. Accordingly, the image light that enters polarization modulator P71 becomes unpolarized light, hence the image light does not present any unevenness in the direction of polarization. Therefore, the light intensity distribution of light that passed through polarization modulator P71 is free from unevenness. As a result, it is possible to prevent unevenness of the light intensity distribution of the image light also in the single-plate projector.

Although the present invention has been explained with reference to the exemplary embodiments, the present invention should not be limited to the above exemplary embodiments. Various modifications that can be understood by those skilled in the art may be made to the structures and details of the present invention within the scope of the present invention.

For example, in the above exemplary embodiments, the light source unit is a hybrid type that includes a phosphor and a laser light source, however, the present invention is not limited to this example. As a variational example, the light source unit may include multiple kinds of laser light sources emitting different laser beams, instead of using a phosphor.

Alternatively, in the above exemplary embodiments, the illuminance uniformizing unit is light tunnel LT2, however the present invention should not be limited to this example. As a variational example, a rod integrator may be used instead of light tunnel LT2.

Part or all of each of the above exemplary embodiments is described as the following SUPPLEMENTARY NOTES, but the invention should not be limited to these SUPPLEMENTARY NOTES.

[Supplementary Note 1]

A projection display apparatus comprising:

a light source unit including a light emitting element;

an image light generator that modulates light from the light source unit to emit image light;

a projecting unit that projects the image light;

a polarization modulator on which the image light is made incident and that emits light in a particular polarization state; and, a depolarizer that is arranged on an optical path between the light emitting element and the polarization modulator.

[Supplementary Note 2]

The projection display apparatus according to SUPPLEMENTARY NOTE 1, wherein the depolarizer is composed of two wedge-shaped quartz plates that have optical anisotropy, the two quartz plates being arranged such that their optical axes are oriented at an angle of 45 degrees to each other.

[Supplementary Note 3]

The projection display apparatus according to SUPPLEMENTARY NOTE 1 or 2, wherein the depolarizer converts light that entered the depolarizer to non-polarized light.

[Supplementary Note 4]

The projection display apparatus according to any one of SUPPLEMENTARY NOTES 1 to 3, wherein the depolarizer is arranged on an optical path between the light source unit and the image light generator.

[Supplementary Note 5]

The projection display apparatus according to any one of SUPPLEMENTARY NOTES 1 to 4, further comprising an illuminating unit, wherein the illuminating unit includes:

an illuminance uniformizing unit that makes the illuminance of light from the light source unit uniform;

a prism unit that makes light that exited from the illuminance uniformizing unit incident on the image light generator and that makes the image light emitted from the image light generator incident on the projecting unit; and a lens that is arranged on an optical path between the illuminance uniformizing unit and the prism unit, wherein the depolarizer is arranged on an optical path between the lens and the prism unit.

[Supplementary Note 6]

The projection display apparatus according to any one of SUPPLEMENTARY NOTES 1 to 3, wherein the light source unit includes:

a light emitting element for excitation;

a phosphor that emits fluorescence light according to light from the light emitting element for excitation; and a combiner that combines the fluorescence light emitted by the phosphor and polarized light emitted from the light emitting element, wherein the depolarizer is arranged on an optical path of the polarized light emitted by the light emitting element in the light source unit.

[Supplementary Note 7]

The projection display apparatus according to any one of SUPPLEMENTARY NOTES 1 to 3, wherein the depolarizer is arranged on an optical path between the image light generator and the polarization modulator.

[Supplementary Note 8]

The projection display apparatus according to any one of SUPPLEMENTARY NOTES 1 to 3, wherein a plurality of the image light generators are provided as the image light generator, wherein the projection display apparatus further includes a prism unit that spectrally separates light from the light source unit to make a separated light incident to each image light generator and combines the image lights emitted from each image light generator to make a combined image light incident to the projecting unit, wherein the depolarizer is arranged on an optical path between the light emitting element and the prism unit or on an optical path between the prism unit and the polarization modulator.

[Supplementary Note 9]

The projection display apparatus according to any one of SUPPLEMENTARY NOTES 1 to 8, wherein the polarization modulator extracts right-handed circularly polarized light and left-handed circularly polarized light alternately from the image light in a time division manner.

[Supplementary Note 10]

The projection display apparatus according to any one of SUPPLEMENTARY NOTES 1 to 8, wherein the polarization modulator alternately extracts, from the image light in a time division manner, two lineally polarized lights whose polarization directions are different from each other.

[Supplementary Note 11]

The projection display apparatus according to any one of SUPPLEMENTARY NOTES 1 to 8, wherein the polarization modulator extracts light that is in any polarization state, from among right-handed circular polarization, left-handed circular polarization, linear polarization and elliptical polarization, alternately from the image light in a time division manner.

[Supplementary Note 12]

The projection display apparatus according to any one of SUPPLEMENTARY NOTES 1 to 11, wherein the depolarizer changes a polarization state of incident light so that light made incident on the depolarizer is converted to light that has a plurality of different polarization states in the same plane perpendicular to the direction of propagation of the light.

[Supplementary Note 13]

A projection display method for a projection display apparatus, comprising:

eliminating polarization of image light generated by light from a light source unit; and emitting the image light with respect to which polarization was eliminated as light in a particular polarized state.

Description of Reference Numerals

| | |
|---|---|
| 100, 200, 300, 400 | projector |
| 10, 11 | light source unit |
| 20, 21 | illumination optical system |
| LT | light tunnel (illuminance uniformizing unit) |
| 25, 65 | lens unit |
| L21 | lens |
| P21 | prism unit |
| MD | display device (image light generator) |
| PL21, PL61 | projecting unit |
| P31, PL71 | polarization modulator |
| D31, D32, D33, D71 | depolarizing element (depolarizer) |

The invention claimed is:

1. A projection display apparatus, comprising:
   a light source unit including a plurality of light emitting elements;
   an image light generator that modulates light from the light source unit to emit image light;
   a projecting unit that projects the image light;
   a polarization modulator on which the image light is made incident and that emits light in a particular polarization state;
   a depolarizer
   which is composed of two wedge-shaped quartz plates that have optical anisotropy, the two wedge-shaped quartz plates being arranged such that their optical axes are oriented at an angle of 45 degrees to each other; and
   an illuminating unit,
   wherein the illuminating unit includes:
      an illuminance uniformizing unit that makes an illuminance of light from the light source unit uniform, an exit surface of the illuminance uniformizing unit being conjugate to a surface of the image light generator on which an image is formed;
      a prism unit that makes light that exited from the illuminance uniformizing unit incident on the image light generator and that makes the image light emitted from the image light generator incident on the projecting unit; and
      a lens that is arranged on an optical path between the illuminance uniformizing unit and the prism unit; and
   wherein the depolarizer is arranged on an optical path between the lens and the prism unit.

2. The projection display apparatus according to claim 1, wherein the depolarizer converts light that entered the depolarizer to non-polarized light.

3. The projection display apparatus according to claim 1, wherein the polarization modulator extracts right-handed circularly polarized light and left-handed circularly polarized light alternately from the image light in a time division manner.

4. The projection display apparatus according to claim 1, wherein the depolarizer is removably provided.

5. The projection display apparatus according to claim 1, wherein the plurality of light emitting elements includes laser diodes.

6. The projection display apparatus according to claim 1, wherein the depolarizer consists of the two wedge-shaped quartz plates.

7. A projection display apparatus, comprising:
   a light source unit including a light emitting element;
   an image light generator that modulates light from the light source unit to emit image light;
   a projecting unit that projects the image light;

a polarization modulator on which the image light is made incident and that emits light in a particular polarization state;
a depolarizer,
wherein the illuminating unit includes:
- an illuminance uniformizing unit that makes an illuminance of the light from the light source unit uniform, an exit surface of the illuminance uniformizing unit being conjugate to a surface of the image light generator on which an image is formed;
- a prism unit that makes light that exited from the illuminance uniformizing unit incident on the image light generator and that makes the image light emitted from the image light generator incident on the projecting unit; and
- a lens that is arranged on an optical path between the illuminance uniformizing unit and the prism unit, and wherein the depolarizer is arranged on an optical path between the lens and the prism unit.

8. A projection display method for a projection display apparatus, the projection display method comprising:
eliminating, by a depolarizer, polarization of image light generated by light from a light source unit that includes a plurality of light emitting elements;
emitting the image light with respect to which polarization was eliminated as light in a particular polarized state,
- wherein the depolarizer is composed of two wedge-shaped quartz plates that have optical anisotropy, the two wedge-shaped quartz plates being arranged such that their optical axes are oriented at an angle of 45 degrees to each other; and
passing the light from the light source unit through an illuminating unit,
wherein the illuminating unit includes:
- an illuminance uniformizing unit that makes an illuminance of light from the light source unit uniform, an exit surface of the illuminance uniformizing unit being conjugate to a surface of an image light generator on which an image is formed;
- a prism unit that makes light that exited from the illuminance uniformizing unit incident on the image light generator and that makes the image light emitted from the image light generator incident on a projecting unit; and
- a lens that is arranged on an optical path between the illuminance uniformizing unit and the prism unit, and wherein the depolarizer is arranged on an optical path between the lens and the prism unit.

9. The projection display method according to claim 8, wherein the depolarizer is removably provided.

10. The projection display method according to claim 8, wherein the plurality of light emitting elements includes laser diodes.

11. The projection display method according to claim 8, wherein the depolarizer consists of the two wedge-shaped quartz plates.

12. The projection display apparatus according to claim 1, further comprising:
another lens that is arranged on an optical path between the depolarizer and the image light generator.

13. The projection display apparatus according to claim 12, wherein said lens and said another lens are disposed adjacent to the depolarizer to sandwich the depolarizer in an optical path between the illuminance uniformizing unit and the image light generator.

14. The projection display apparatus according to claim 13, wherein the prism unit is disposed between said another lens and the projecting unit.

* * * * *